United States Patent
Nguyen et al.

(10) Patent No.: US 11,650,290 B2
(45) Date of Patent: May 16, 2023

(54) SYSTEM AND METHOD OF DETERMINING TARGET'S RANGE PROFILES FOR COSTAL SURVEILLANCE RADARS

(71) Applicant: VIETTEL GROUP, Ha Noi (VN)

(72) Inventors: Van Loi Nguyen, Ha Noi (VN); Thanh Son Le, Ha Noi (VN); Trung Kien Tran, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 77 days.

(21) Appl. No.: 17/138,568

(22) Filed: Dec. 30, 2020

(65) Prior Publication Data
US 2021/0373123 A1    Dec. 2, 2021

(30) Foreign Application Priority Data

May 29, 2020   (VN) .............................. 1-2020-03070

(51) Int. Cl.
*G01S 7/41*  (2006.01)
*G01S 7/292* (2006.01)
*G01S 13/04* (2006.01)

(52) U.S. Cl.
CPC ............ *G01S 7/411* (2013.01); *G01S 7/2926* (2013.01); *G01S 13/04* (2013.01)

(58) Field of Classification Search
None
See application file for complete search history.

(56) References Cited

U.S. PATENT DOCUMENTS

| | | | | |
|---|---|---|---|---|
| 5,469,168 A | * | 11/1995 | Anderson | G01S 13/951 342/192 |
| 6,888,493 B2 | * | 5/2005 | Driessen | G01S 13/42 342/91 |
| 2009/0052737 A1 | * | 2/2009 | Lycett | G01S 13/91 382/103 |
| 2010/0073218 A1 | * | 3/2010 | Stockmann | G01S 13/5248 342/146 |
| 2016/0266247 A1 | * | 9/2016 | Hjelmstad | G01S 13/865 |
| 2021/0293960 A1 | * | 9/2021 | Kreitinger | G01S 17/34 |

\* cited by examiner

*Primary Examiner* — Erin F Heard
*Assistant Examiner* — Hailey R Le
(74) *Attorney, Agent, or Firm* — Patenttm.us

(57) ABSTRACT

Determining a target's range profiles is an important issue for coastal surveillance radars because it can give us the knowledge about the target, for example, target's type, target's structure and its length along radial direction. Some modern radars nowaday are equipped with the feature of target's range profile extraction, but the results are not accurate due to limitations in processing algorithms. The invention "system and method of determining target's range profiles for coastal surveillance radars" solves the above problem in the direction of proposing a system of technical solutions and associated algorithm improvements.

1 Claim, 3 Drawing Sheets

SYSTEM AND METHOD OF DETERMINING TARGET'S RANGE PROFILES FOR COSTAL SURVEILLANCE RADARS

TECHNICAL AREA

The invention refers to the system and method of determining targets' reflected powers by radial direction (or target's range profile) for coastal surveillance radars. The system and method of determining the target's range profiles proposed in the invention are applied in the field of maritime surveillance, safety and security.

THE TECHNICAL STATUS OF THE INVENTION

The system and method of determining the target's range profiles are used in the modern radars to calculate the target's length along the radial direction as well as assist in automatic target recognition based on the graph of the target's range profiles.

A radar is a system containing the antennas, transceiver and radio signal processing units to detect the targets based on their echo signals.

The target's length along the radial direction relates to the target's true length and is determined based on the target's range profiles.

Nowaday, some modern coastal surveillance radars are equipped with the features which support displaying the target's range profiles and estimating the target's length along the radial direction. However, actual observations at these radar stations show that the target's range profiles are often not correct with the target's type (as shown in FIG. 1 and FIG. 2) such as: having many peaks due to influence of noise, length mismatch (for a target moving in the area near the radar station, its length along the radial direction is longer than reality—FIG. 1, while for a target moving in the area far from the radar station, its length along the radial direction is shorter than reality—FIG. 2) dues to influence of signal to noise ratio. Therefore, it is necessary to study and propose another method to determine the target's range profiles more accurately. This is significant not only to improve some of the existing features on the new generation coastal radars, but also as a prerequisite to help us increase the probability of maritime target recognition/classification.

THE TECHNICAL NATURE OF THE INVENTION

A first purpose of the invention is to propose a system to determine the target's range profiles for the coastal surveillance radars. Toward this goal, the system according to the patent consists of two clusters: coarse determination cluster and smoothing and truncated cluster.

The coarse determination cluster determines a raw target's range profiles. The coarse determination cluster consists of two blocks which are the memory block and the block of averaging by azimuth.

The smoothing and truncated cluster extracts the target's range profiles and consists of three blocks that are block of storing and averaging over the scans, block of thresholding and block of extracting target's range profiles.

The memory block stores the reflected power-vectors from the area containing the considered target when the antenna beam sweeps the target in sequence time.

The block of averaging by azimuth determines a raw target's profile by averaging reflected power-vectors stored in memory block.

The block of storing and averaging over the scans saves the raw target's range profiles from N consecutive scans (N−1 previous scans and the current scan). Then, selecting the previous scans at which the target's aspect angles and the target's aspect angle at current scan are "the same" (that means they are not far apart from each other) to average raw target's range profiles corresponding to the selecting scans.

In the block of thresholding 3 thresholds (left threshold, right threshold and common threshold) are calculated. These thresholds will be used for the next steps.

The block of extracting target's range profiles derives the final target's range profiles by using a new proposed algorithm.

A second purpose of the invention is to propose a method to determine the target's range profiles for coastal surveillance radars. To achieve the above purpose, the method proposed in the invention includes the following steps:

Step 1: retrieving and storing power information from target location; This step helps to obtain 61 reflected power-vectors from the target area corresponding to the 61 azimuths. Each reflected power-vector has 201 values corresponding to the reflected powers from 201 range resolution cells.

Step 2: determining the raw target's range profile for each scan.

Step 3: averaging raw target's range profiles by scans.

Step 4: determining 3 thresholds: the common $\lambda$, left $\lambda_{left}$ and right $\lambda_{right}$ thresholds. The values $\lambda$ (respectively, $\lambda_{left}$ and $\lambda_{right}$) represents the power level of noise (respectively, noise in the left and right of the target's centroid).

Step 5: extracting the target's range profiles. At this step, the reflected powers from the target is calculated and compared with the common, left and right thresholds.

DETAILED INVENTION DESCRIPTION

Figure 1:
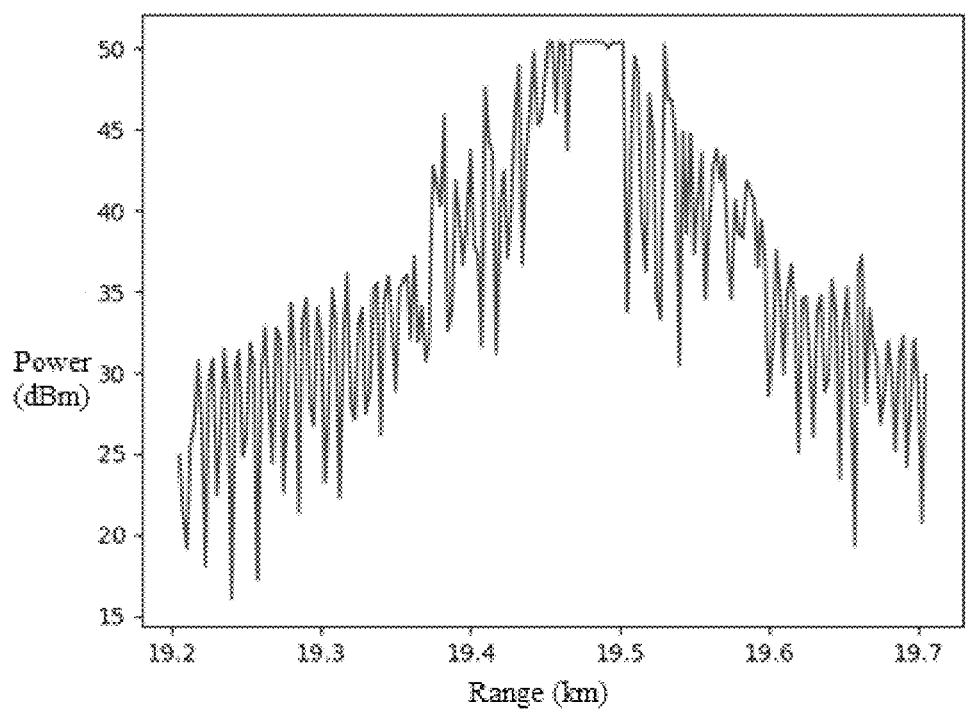
FIG. 1 represents a range profile of a vessel with length 181 m moving toward the radar station at the distance of 19.4 km from the radar station.
Figure 2:
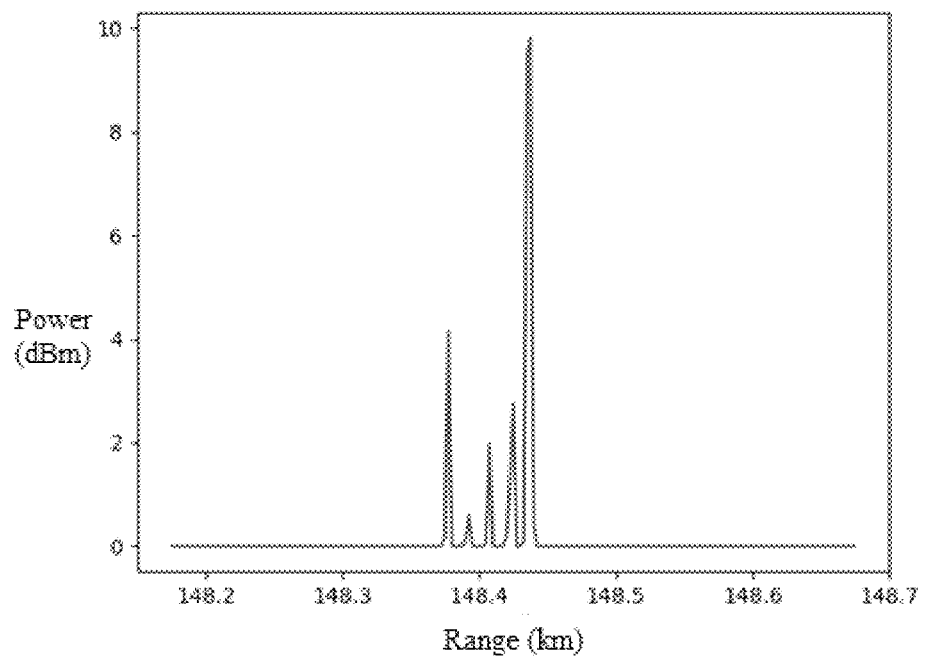
FIG. 2 is a range profile of a vessel with length 132 m moving toward the radar station at the distance of 148.4 km from the radar station.
Figure 3:
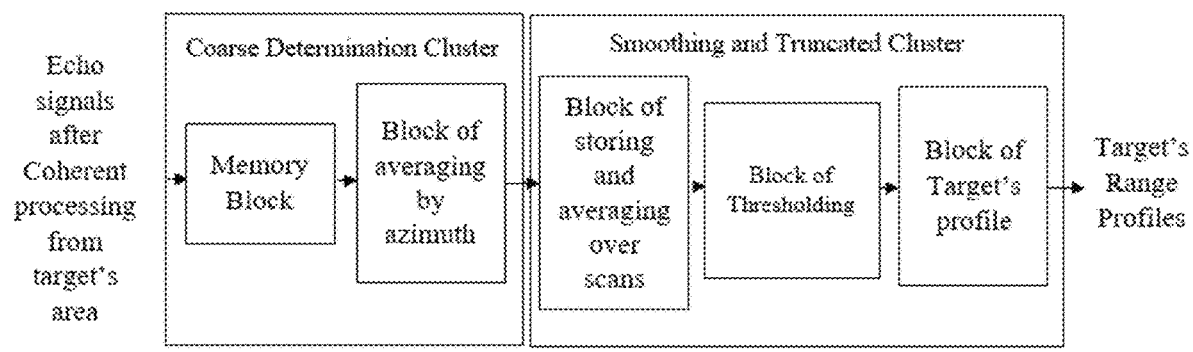
FIG. 3 is the proposed diagram for target's range profile extraction.

The system of determining the target's range profiles for coastal surveillance radars is integrated into the radar data processing system. As shown in FIG. 3, the system under the present application includes:

The coarse determination cluster which determines the raw target's range profiles that will be used as the input of the smoothing and truncated cluster to obtain the target's range profiles.

A raw target's range profile is a power-vector containing the mean of the reflected power-vectors from the target's area by azimuth (Step 2 below).

The reflected power from a range cell is the power obtained after coherent processing at the same range cell.

As shown in FIG. 3:

The coarse determination cluster consists of two blocks: the memory block that stores the reflected power-vectors by radial direction from the area containing target when the antenna beam sweeps over the target in sequence time, and the block of averaging by azimuth that takes the average of all target's reflected power-vectors by azimuth. The output of the block of averaging by azimuth is called the raw target's range profiles.

The smoothing and truncated cluster consists of three blocks:

The block of storing and averaging over scans stores the raw target's range profiles from N consecutive scan (N=12, consisting of 11 previous radar scans and the current scan). Then, selecting the scans at which the target's aspect angle and the target's aspect angle at current scan are "the same" (that means they are not far apart from each other) to average raw target's range profiles corresponding to the selecting scans.

In the block of thresholding 3 thresholds (left threshold, right threshold and common threshold) are calculated. These thresholds will be used in the next steps. The value of common threshold (respectively, left threshold and right threshold) represents the power level of noise in the both radial directions (left and right) of the target's centroid (respectively, noise in the left and right radial direction of the target's centroid).

The block of extracting target's range profiles derives the final target's range profiles by using a new proposed algorithm. The output of this block is the final target's range profile.

The method of determining the target's range profiles includes the following steps:

Step 1: Getting and Saving Reflected Power-Vectors from Target's Area

For each confirmed target (targets can include ships, boats or other sea objects), at target's position (target's centroid) in every scan we get 61 reflected power-vectors by radial direction, each of them is a 201-dimensional vector of the form $(x_1, \ldots, x_{100}, x_{101}, x_{102}, \ldots, x_{201})$. So, we obtain a 61×201 matrix of the form:

$$\begin{bmatrix} x_1^{(1)}, \ldots, & x_{100}^{(1)}, & x_{101}^{(1)}, & x_{102}^{(1)}, \ldots, & x_{201}^{(1)} \\ & & \ldots & & \\ x_1^{(31)}, \ldots, & x_{100}^{(31)}, & x_{101}^{(31)}, & x_{102}^{(31)}, \ldots, & x_{201}^{(31)} \\ & & \ldots & & \\ x_1^{(61)}, \ldots, & x_{100}^{(61)}, & x_{101}^{(61)}, & x_{102}^{(6)}, \ldots, & x_{201}^{(61)} \end{bmatrix}$$

The value $x_{101}^{(31)}$ is related to the target's centroid. The numbers 61, 201 are chosen to ensure that large targets (like an aircraft carrier) can be covered. These numbers depend on the radar range and azimuth resolutions and can be changed via the radar interface display. Retrieving and saving power information from target position is performed automatically.

At the end of this step we obtain 61 reflected power-vectors from the target's area corresponding to 61 azimuths. Each power-vector has 201 values corresponding to the reflected powers from 201 range cells.

Step 2: Determining Raw Target's Range Profiles

From the 61 reflected power-vectors according to the 61 azimuths in step 1, averaging the power values by corresponding positions to create the raw target's range profile:

$$\bar{x}_i = \frac{1}{61} \sum_{j=1}^{61} x_i^{(j)}, i = 1, 2, \ldots, 201$$

The power-vector $(\bar{x}_1, \bar{x}_2, \ldots, \bar{x}_{201})$ at the output of step 2 is called "raw target's range profile at the current scan".

Step 3: Averaging Over Scans.

Figure 5:
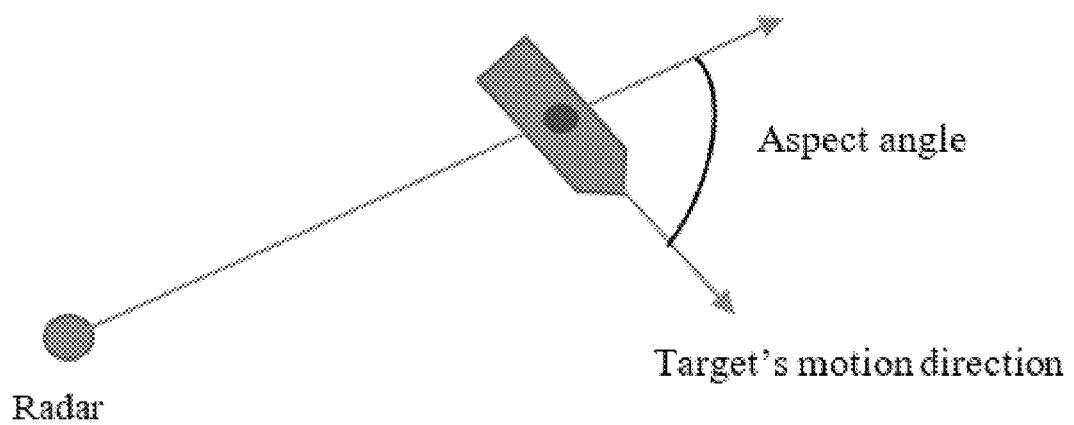
FIG. 5 is illustrated the target's aspect angle.

Storing the raw target's range profiles over 12 consecutive radar scans (11 previous scans and the current scan) from step 2 and a given threshold $a_{thres}$ (degree). Determining the scans among 11 previous scans such that the difference of target's aspect angles at these scans and at current scan (see FIG. 5) does not exceed $a_{thres}$. Then, averaging the power-values by corresponding position of the power-vectors in these scans (including the current scan) to generate an over-scan target's range profile.

The use of 12 radar scans is optimal for the case when radar operates in the mode of 6 rounds per minute. If we use more than 12 scans, the reflected signals could be non-coherent. If we use less than 12 scans, it could follow the unstability of the data.

Step 4: Calculating Thresholds.

Let $(x_1, \ldots, x_{100}, x_{101}, x_{102}, \ldots, x_{201})$ be the over-scan target's range profile at the current radar scan which is obtained in step 3. The value $x_{101}$ is related to the target's centroid. By using the histogram with 14 bins for:

all 201 values $x_i$ (i=1, . . . , 201) we obtain the bin with maximum frequency. The upper-bound of this bin will be used as the common threshold and denoted by $\lambda$.

values $x_i$ (i=1, . . . , 100) we obtain the bin with maximum frequency. The upper-bound of this bin will be used as the left threshold and denoted by $\lambda_{left}$.

values $x_i$ (i=102, . . . , 201) we obtain the bin with maximum frequency. The upper-bound of this bin will be used as the right threshold and denoted by $\lambda_{right}$.

The threshold $\lambda$ (respectively. $\lambda_{left}$ and $\lambda_{right}$) represents the power-level of noise (respectively, noise in the left and right of the target' centroid) $(x_1, \ldots, x_{100}, x_{101}, x_{102}, \ldots, x_{201})$. The bin number (14 bins) is selected by using Freedman-Diaconis rule.

Step 5: Extracting Final Target's Range Profiles.

From the over-scan target's range profile $(x_1, \ldots, x_{100}, x_{101}, x_{102}, \ldots, x_{201})$ and three thresholds $\lambda$, $\lambda_{left}$ and $\lambda_{right}$ we do the following:

Determining the power-vector $(y_1, \ldots, y_{100}, y_{101}, y_{102}, \ldots, y_{201})$ by $$y_i = \begin{cases} x_i & \text{for } x_i \geq \lambda \\ 0 & \text{for } x_i < \lambda \end{cases}$$

Creating a window with only one range cell corresponding to the value $y_{101}$:

Taking 18 range cells near the range cell $y_{101}$ (corresponding to the values $y_{92}, y_{93}, \ldots, y_{100}, y_{102}, \ldots, y_{110}$) Since the resolution of the radar using in the invention is 3 m, the 18 range cells would have a distance of 54 m, this distance is suitable for almost marine targets. If we take less range cells, statistics are not guaranteed. If more range cells are taken, the lengths of many types of marine targets may be exceeded.

Calculating the Medians $M_{left}$ and $M_{right}$ of the values $y_{92}, y_{93}, \ldots, y_{100}$ and $y_{102}, \ldots, y_{110}$ respectively.

Calculating the values: $M_{left} - \lambda_{left}$ and $M_{right} - \lambda_{right}$.
These values show the power level of the target relative to the background noise on the left and right sides of the window.

Extending the window one adjacent cell to the left of the window if:

$$M_{left} - \lambda_{left} \geq M_{right} - \lambda_{right} \tag{1}$$

Otherwise, extending the window one adjacent cell to the right of the window.

The process of extending the window is ended when $$M_{left} \text{ (respectively, } M_{right}) < \Delta_{thres} \times \Sigma p_{win} \tag{2}$$

always satisfies, where $\Sigma p_{win}$ is the sum of powers in all cells of the window;

$\Delta_{thres}$ is a threshold which depends on the length of the window l(win):

$$\Delta_{thres} = \begin{cases} 0.025 & \text{for } l(\text{win}) < 16 \\ 0.0125 & \text{for } l(\text{win}) < 30 \\ 0.01 & \text{for } l(\text{win}) < 45 \\ 0.0075 & \text{for } l(\text{win}) < 60 \\ 0.005 & \text{for } l(\text{win}) > 60 \end{cases} \tag{3}$$

From (3) it follows that the value $\Delta_{thres}$ i is chosen adaptively. The numbers 16, 30, 45 and 60 is selected based on the radar range resolution (in this patent the radar range resolution is 3 m) and the length of the vessels of various types. The values 0.0125, 0.01, 0.0075 and 0.005 is chosen by experience.

Effectiveness of the Invention

Figure 4:
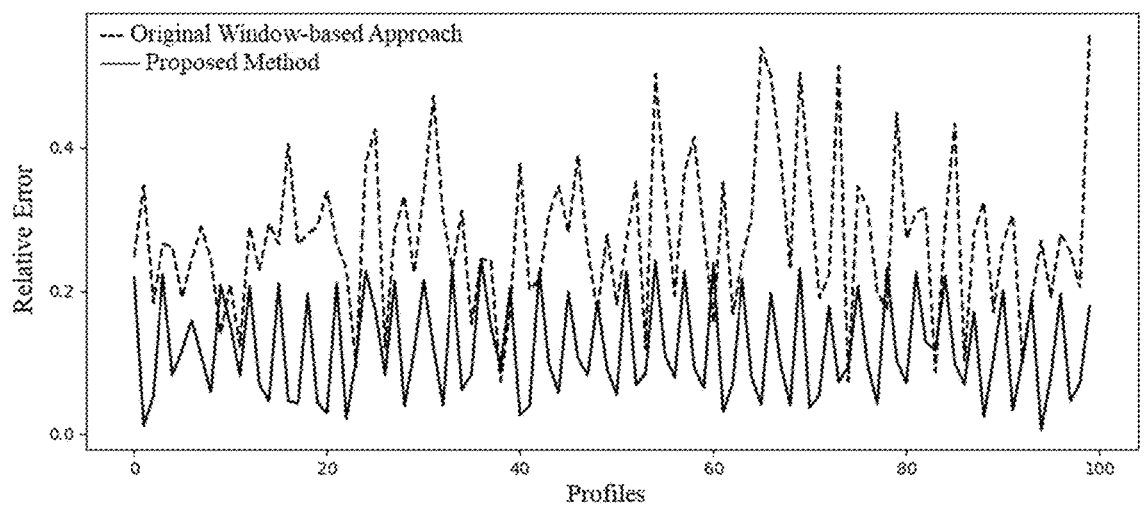
FIG. 4 presents the error of target's length estimation using target's range profiles extracted by the classical window-based method and the proposed method.

The experimental results with the real data obtained from the 3-meter range resolution radar in Vietnam show that the proposed new method reduces the estimated error of the target's length along the radial direction by 11.6% compared to the classical window-based method (FIG. 4).

The invention claimed is:

1. A method to determine the target's range profiles for coastal surveillance radars includes five steps:

Step 1: retrieving and storing power information from a target location; obtaining sixty-one reflected power-vectors from a target area corresponding to the sixty-one azimuths, each reflected power-vector has two hundred one values corresponding to reflected powers from two hundred one range resolution cells;

Step 2: determining a raw target's range profile for each scan, from the sixty-one reflected power-vectors according to the sixty-one azimuths in step 1, averaging power values by corresponding positions to create the raw target's range profile;

Step 3: averaging raw target's range profiles by scans, storing the raw target's range profiles over twelve consecutive radar scans (eleven previous scans and a current scan) from step 2 and a given threshold $a_{thres}$ (degrees), determining the scans in eleven previous scans such that a difference of target's aspect angles at these scans and at the current scan does not exceed $a_{thres}$, then, averaging the power values by corresponding position of the power-vectors in these scans (including the current scan) to generate an over-scan target's range profile;

Step 4: determining 3 thresholds: a common $\lambda$, a left $\lambda_{left}$ and a right $\lambda_{right}$ thresholds, let $(x_1, \ldots, x_{100}, x_{101}, x_{102}, \ldots, x_{201})$ be the over-scan target's range profile at the current radar scan which is obtained in step 3, The value $x_{101}$ is related to the target's centroid; by using a histogram with fourteen bins for:

obtaining from all two hundred one values $x_i$ (i=1, ..., 201) the bin with maximum frequency, using an upper-bound of this bin as the common threshold and denoted by $\lambda$, values $x_i$ (i=1, ..., 100) we obtain the bin with maximum frequency, an upper-bound of this bin will be used as the left threshold and denoted by $\lambda_{left}$, values $x_i$ (i=102, ..., 201) we obtain the bin with maximum frequency, an upper-bound of this bin will be used as the right threshold and denoted by $\lambda_{right}$, the values $\lambda$ (respectively, $\lambda_{left}$ and $\lambda_{right}$) represent a power level of noise (respectively, noise in the left and right of the target's centroid), Step 5: extracting the target's range profiles, at this step, the reflected powers from the target is calculated and compared with the common, left and right thresholds, from the over-scan target's range profile $(x_1, \ldots, x_{100}, x_{101}, x_{102}, \ldots, x_{201})$ and three thresholds $\lambda$, $\lambda_{left}$ and $\lambda_{right}$ do the following:

determining the power-vector $(y_1, \ldots, y_{100}, y_{101}, y_{102}, \ldots, y_{201})$ by $$y_i = \begin{cases} x_i & \text{for } x_i \geq \lambda \\ 0 & \text{for } x_i < \lambda \end{cases}$$

creating a window with only one range cell corresponding to the value $y_{101}$:

taking eighteen range cells near the range cell $y_{101}$ (corresponding to values $y_{92}, y_{93}, \ldots, y_{100}, y_{102}, \ldots, y_{110}$), calculating the medians $M_{left}$ and $M_{right}$ of the values $y_{92}, y_{93}, \ldots, y_{100}$ and $y_{102}, \ldots, y_{110}$ respectively, calculating the values: $M_{left} - \lambda_{left}$ and $M_{right} - \lambda_{right}$, these values show the power level of the target relative to the background noise on the left and right sides of the window, extending the window one adjacent cell to the left of the window if:

$$M_{left} - \lambda_{left} \geq M_{right} - \lambda_{right} \tag{1}$$

otherwise, extending the window one adjacent cell to the right of the window, the process of extending the window is ended when $$M_{left} \text{ (respectively, } M_{right}) < \Delta_{thres} \times \Sigma p_{win} \tag{2}$$

always satisfies, where $\Sigma p_{win}$ is the sum of powers in all cells of the window; $\Delta_{thres}$ is a threshold which depends on the length of the window l(win):

$$\Delta_{thres} = \begin{cases} 0.025 & \text{for } l(\text{win}) < 16 \\ 0.0125 & \text{for } l(\text{win}) < 30 \\ 0.01 & \text{for } l(\text{win}) < 45 \\ 0.0075 & \text{for } l(\text{win}) < 60 \\ 0.005 & \text{for } l(\text{win}) > 60 \end{cases} \tag{3}$$

from (3) it follows that the value $\Delta_{thres}$ is chosen adaptively, based on the radar range resolution and the length of the vessels of various types.

* * * * *